July 4, 1950

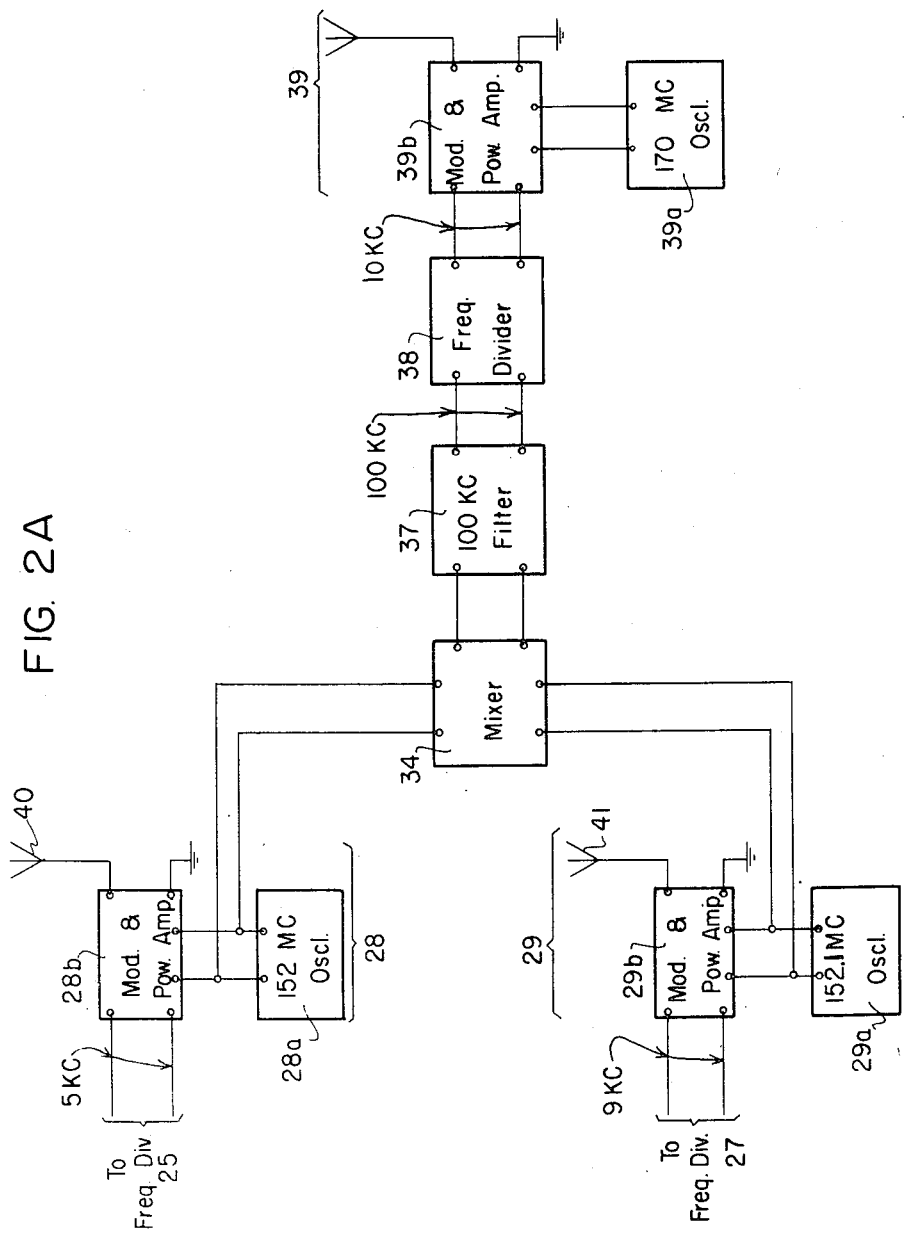

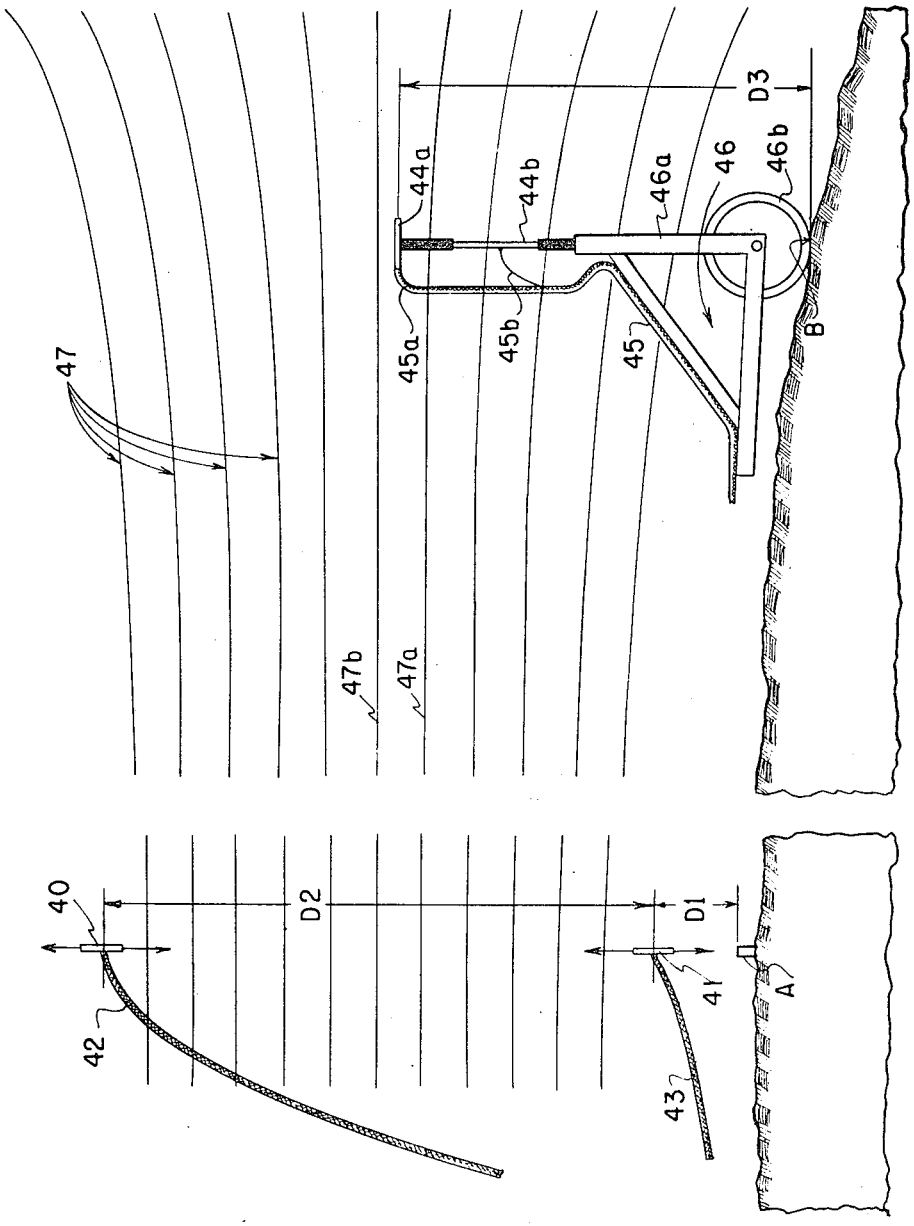

J. E. HAWKINS 2,513,320

RADIO POSITION DETERMINING SYSTEM

Filed Sept. 22, 1948

INVENTOR.
James E. Hawkins

BY
Mason, Kolehmainen,
Rathburn and Wyss
Attys.

July 4, 1950  J. E. HAWKINS  2,513,320
RADIO POSITION DETERMINING SYSTEM
Filed Sept. 22, 1948  8 Sheets-Sheet 6

INVENTOR.
James E. Hawkins

July 4, 1950  J. E. HAWKINS  2,513,320
RADIO POSITION DETERMINING SYSTEM
Filed Sept. 22, 1948  8 Sheets-Sheet 7

INVENTOR.
James E. Hawkins
BY
Attys.

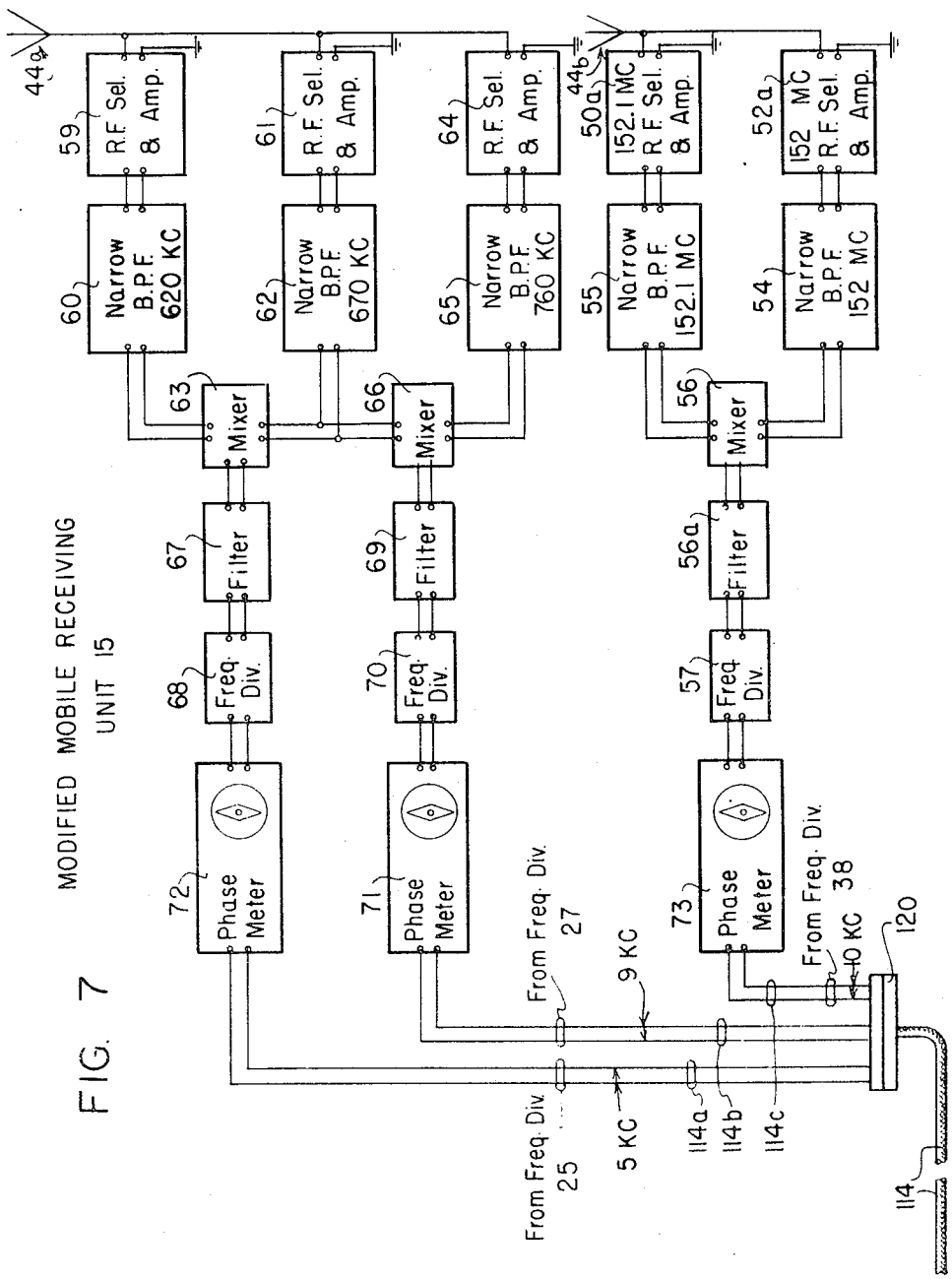

Patented July 4, 1950

2,513,320

UNITED STATES PATENT OFFICE 2,513,320

RADIO POSITION DETERMINING SYSTEM

James E. Hawkins, Tulsa, Okla., assignor to Seismograph Service Corporation, Tulsa, Okla., a corporation of Delaware Application September 22, 1948, Serial No. 50,631

31 Claims. (Cl. 343—105)

The present invention relates to radio survey systems and more particularly to a system for producing reliable elevation data as well as position data at any desired point within an area under survey.

In certain classes of survey operations, such, for example, as seismic survey work on land, it is necessary to obtain elevation data as well as survey point position data with a high degree of accuracy. While reliably accurate radio position finding systems are known, no reliable system for utilizing radio waves to obtain elevation data has heretofore been available. From the standpoint of actual operating practice using conventional surveying methods, it is practically as economical to obtain both elevation and position information as it is to obtain either type of information alone. Hence, radio systems of position determination have not been used to any appreciable extent in survey work. Moreover, most known types of radio position determining systems having the range and accuracy required in survey work require special transmitters operating continuously on clear channel frequencies in the most crowded portion of the frequency spectrum, at least as far as operations in the United States are concerned.

It is an object of the present invention, therefore, to provide an improved system for obtaining position and elevation data in land survey operations.

According to a further object of the invention, an improved position and elevation determining system is provided which makes use of existing broadcast transmitters as position signal sources and only requires the use of low power, ultra high frequency, line-of-sight transmitters as elevation signal sources, thus minimizing the number of special frequency channels required for operation of the system, and interferences with existing radio communicating facilities operating in the same area.

It is a further object of the invention to provide an improved system utilizing radio wave propagation and collection for obtaining accurate elevation data in land survey operations.

It is still another object of the invention to provide an improved radio position determining system of the continuous wave hyperbolic type which does not require the use of special transmitters but makes use of existing broadcast transmitters of known geographic locations as the position signal sources.

It is a still further object of the invention to provide a position and elevation determining system of the character described in which the number of transmitters required is reduced to a minimum by utilizing the elevation signal transmitters as reference signal transmitters for transmitting position reference signals to the survey point.

It is still another object of the invention completely to eliminate from the system all transmitters for transmitting reference signals from the point of reference signal production to the survey point.

According to a still further object of the invention, an improved arrangement is provided for accurately indicating either or both of the position and elevation of a survey point.

The invention, both as to its organization and method of operation, together with further objects and advantages thereof, will best be understood by reference to the following specification taken in connection with the accompanying drawings, in which:

Fig. 1 diagrammatically illustrates the fundamental arrangement of a survey system characterized by the features of the present invention;

Fig. 2 diagrammatically illustrates the equipment provided at the reference and elevation transmitter unit forming a part of the system shown in Fig. 1;

Fig. 3 illustrates the elevation signal wave transmitting antennas, the elevation and position signal wave collecting antenna and the relative positions of these antennas, as well as the family of isophase surfaces developed in space as a result of elevation signal wave radiation by the transmitting antennas;

Figure 1:
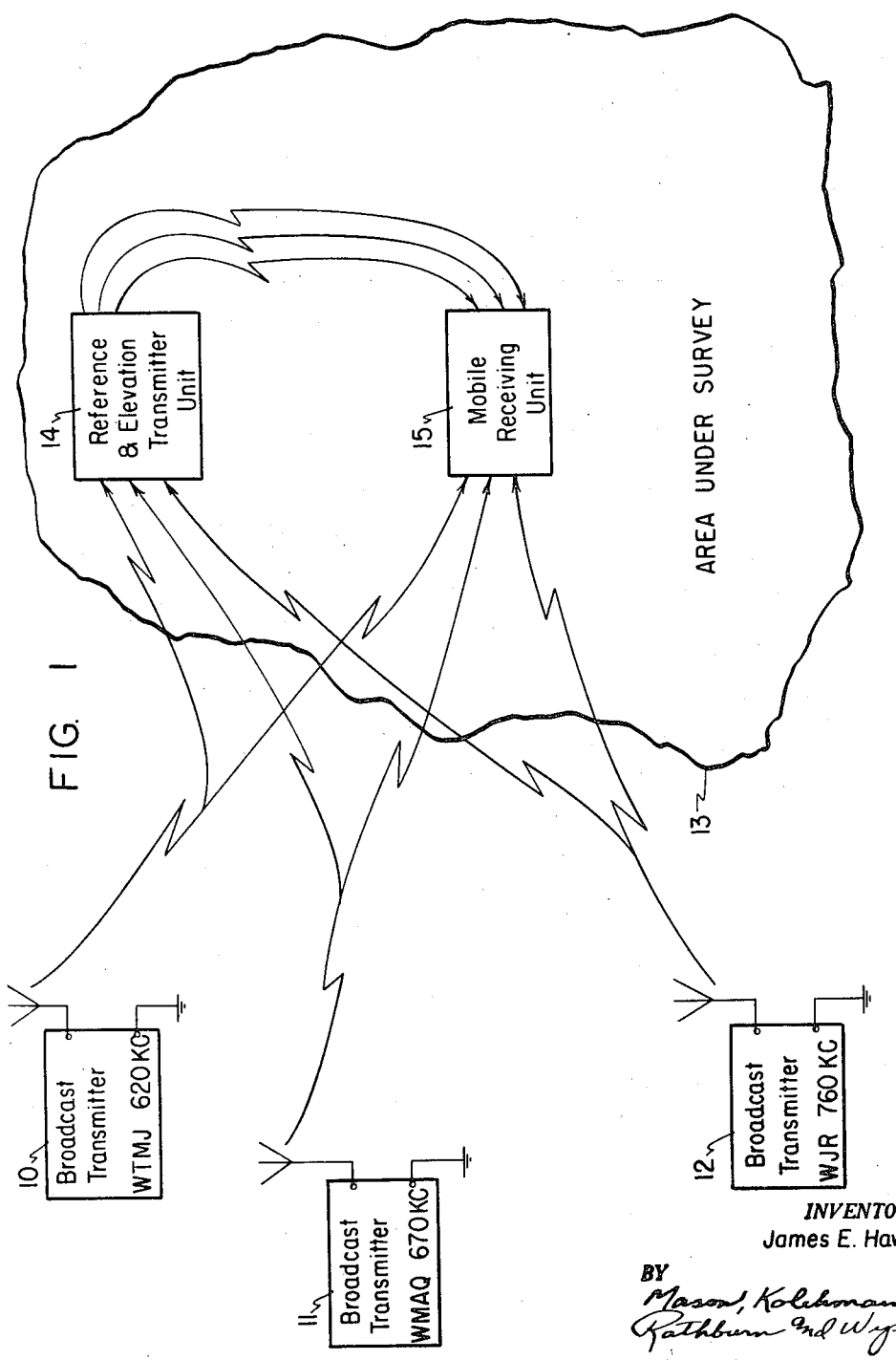
Figure 2:
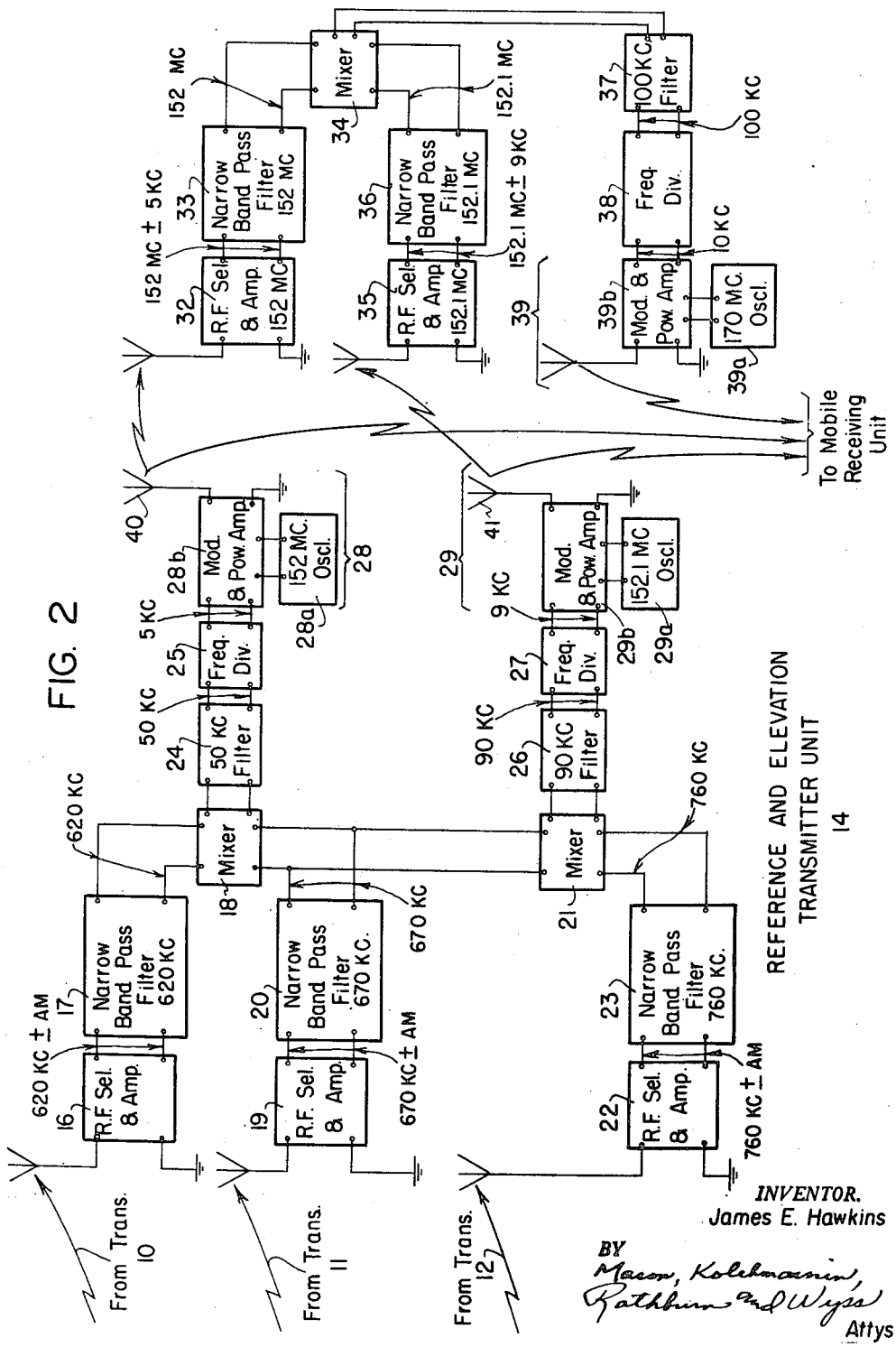
Fig. 2A illustrates a modified arrangement of the apparatus shown in Fig. 2.
Figure 4:
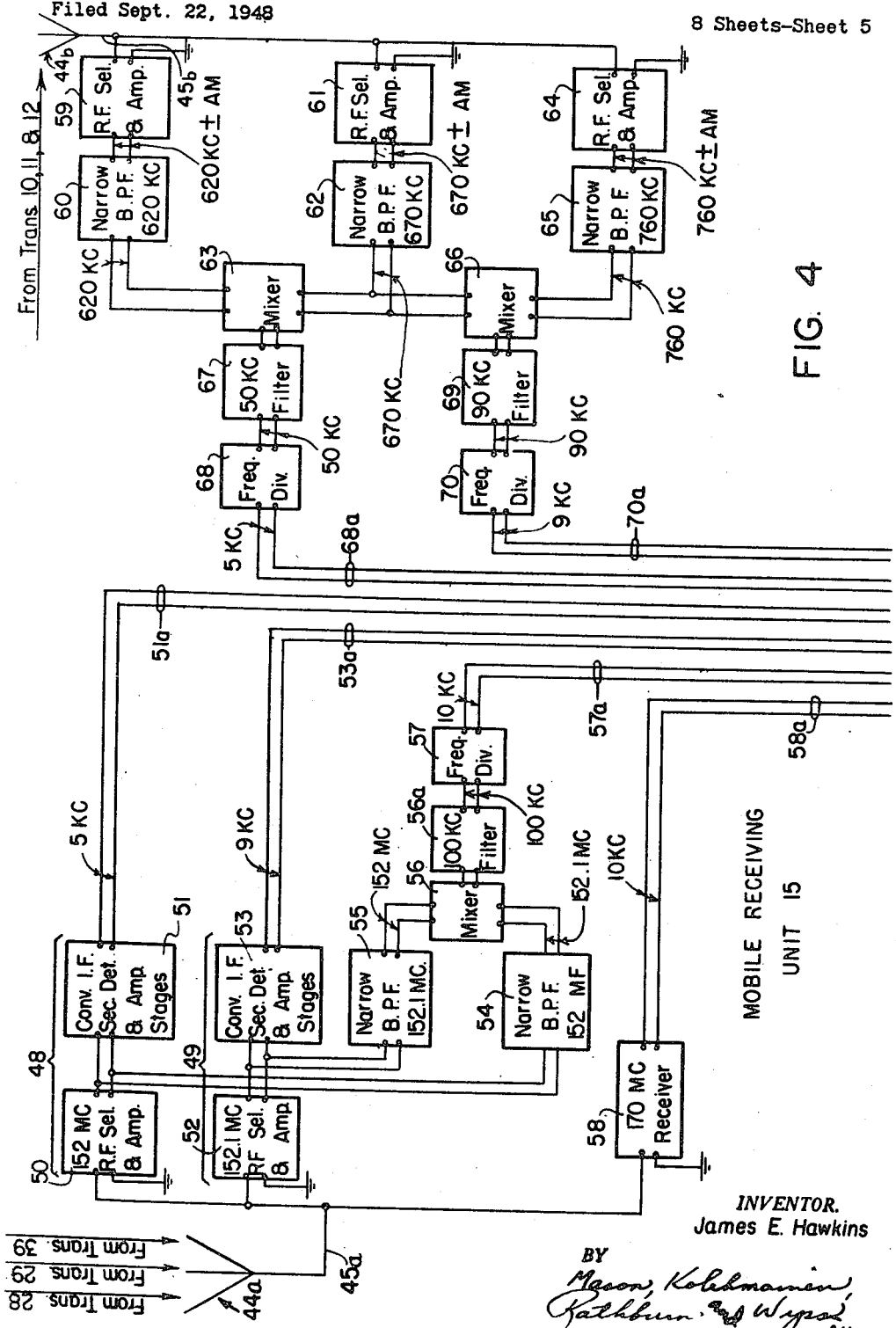
Figure 5:
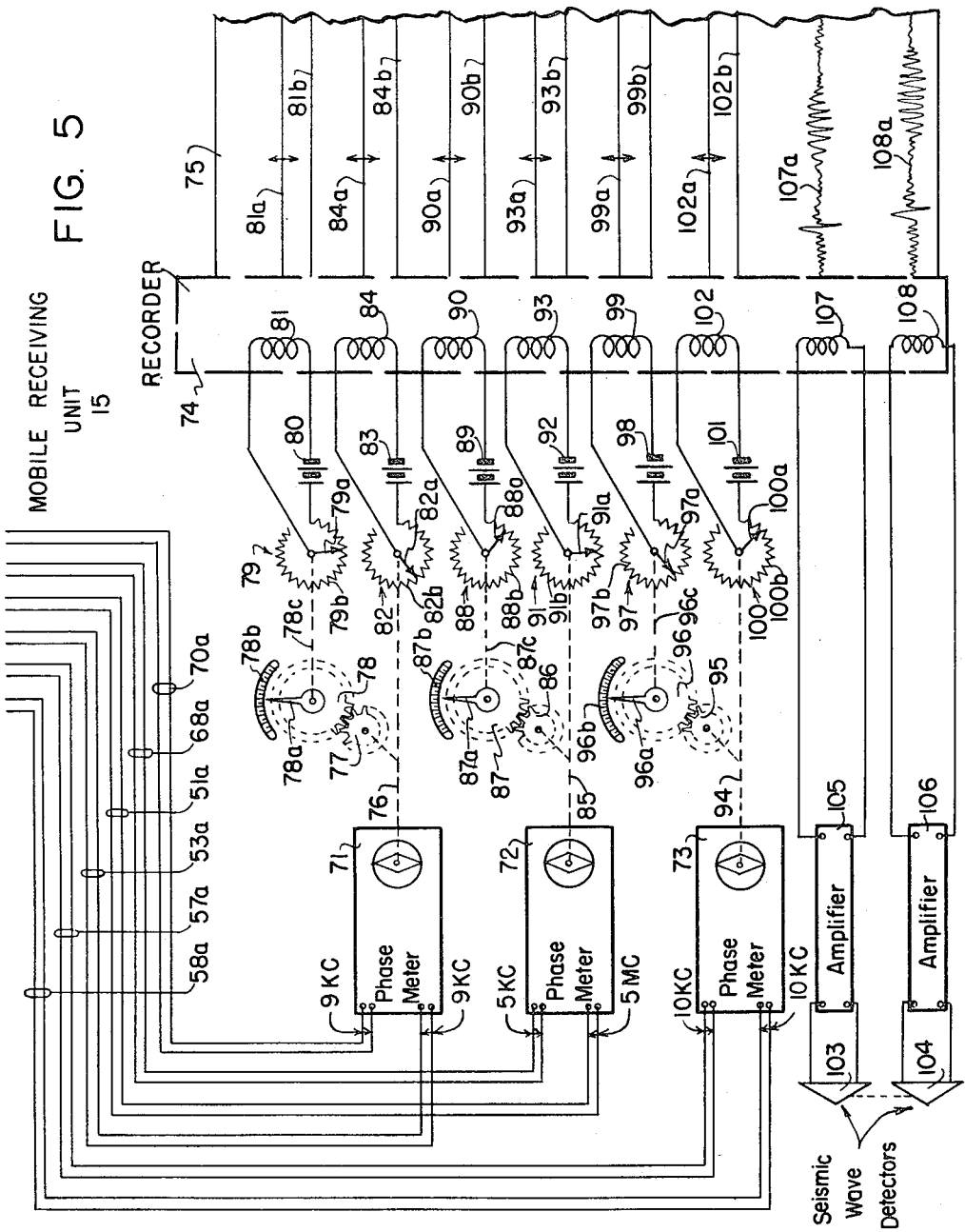
Figure 6:
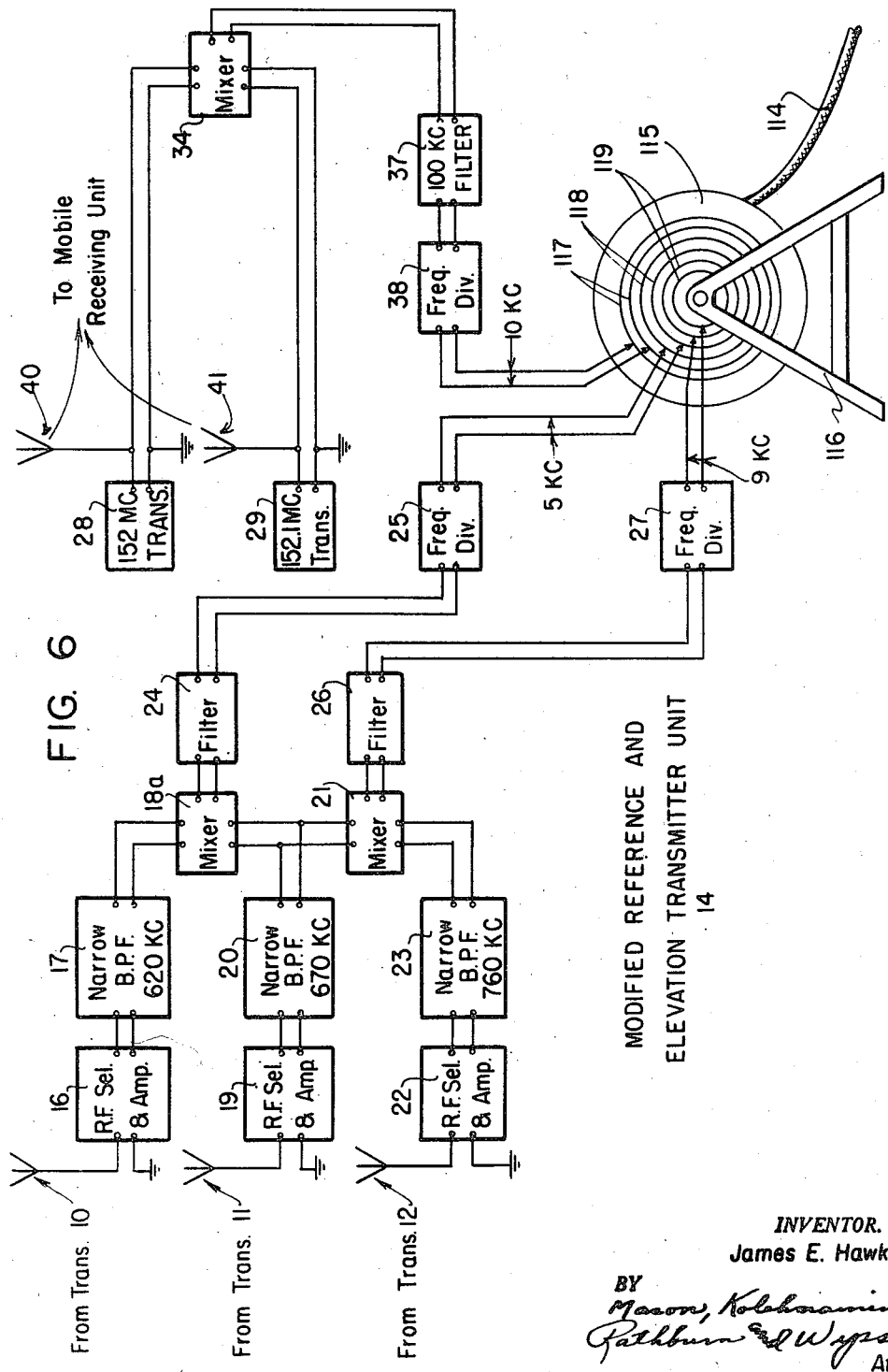

Figs. 4 and 5 when placed one above the other in the order named illustrate the mobile receiving unit forming a part of the system shown in Fig. 1; and Figs. 6 and 7 when laid left to right in the order named illustrate a modified arrangement of the reference and elevation transmitting unit and the mobile receiving unit which may be used instead of the apparatus shown in Figs. 2, 4 and 5 in the system shown in Fig. 1.

Referring now to the drawings and more particularly to Fig. 1 thereof, the present improved survey system is there illustrated as comprising a plurality of geographically spaced apart broadcast transmitters 10, 11 and 12 having radio antennas located at precisely known geographic locations, which commonly radiate program modulated carrier waves to an overlap area which includes an area 13 under survey. If the area 13 under survey is located in the western or central part of Michigan, for example, the broadcast transmitters employed in obtaining the desired position and elevation data may comprise transmitter WTMJ located adjacent Milwaukee, Wisconsin, and operating at a carrier frequency of 620 kilocycles, transmitter WMAQ located adjacent Chicago, Illinois, and operating at a carrier frequency of 670 kilocycles and transmitter WJR located adjacent Detroit, Michigan, and operating at a carrier frequency of 760 kilocycles. These relatively high power transmitters are easily capable of reception at any reception point located within the central and western portions of the State of Michigan, using standard broadcast receivers. Assuming, therefore, that the area 13 under survey is located in one of the western or central counties of Michigan, the program modulated carriers radiated by the three identified transmitters may easily be received at all points within the area under survey at all times when the three transmitters are in operation.

For the purpose of utilizing the signals radiated by the three identified transmitters to provide position and elevation data at a survey point located within the area 13 under survey, a reference and elevation transmitter unit 14 and a mobile receiving unit 15 are provided. In conducting a given survey operation, the reference and elevation transmitter unit 14 may be set up at any desired location; preferably a location adjacent to or just within the border of the area to be surveyed in order to reduce the power requirements of the transmitters embodied in the unit 14 and hence the likelihood of interference with other radio communication facilities operating in the same area. During operation of the system, the unit 14 is essentially a fixed position unit, although for purposes of transportation the components of the unit may be carried by a trailer which is hitched onto the vehicle carrying the components of the mobile receiving unit 15. The latter unit may be moved to any desired position or survey point within the area 13 under survey.

As specifically described below, the transmitters 10, 11 and 12 continuously radiate amplitude modulated carried waves having carrier components of different frequencies, such that an interference pattern is formed in space to blanket the area under survey, all in a manner which will be fully apparent from the mathematical explanation appearing in Honore Patent No. 2,148,267, granted February 21, 1939. Three sets of hyperbolic isophase surfaces are thus effectively produced in space by the carrier components of the waves radiated by the three transmitters. More specifically, the continuously radiated carrier wave components of the waves radiated by the transmitters 10 and 11 produce an interference pattern effectively characterized by a set of hyperbolic isophase surfaces having the radiation points of the transmitters 10 and 11 as foci. Each of these surfaces is representative of the loci of positions of constant phase difference between the carrier components of the waves radiated by the transmitters 10 and 11. Similarly, the signals radiated by the transmitters 11 and 12 provide a carrier wave interference pattern characterized by a second set of hyperbolic isophase surfaces which transversely intersect the surfaces of the first set and have the radiation points of the transmitters 11 and 12 as foci. The hyperbolic surfaces of the second set represent the loci of positions of constant phase difference between the carrier components of the waves radiated by the transmitters 11 and 12. In the system arrangement herein disclosed, the third set of isophase surfaces produced in space by the carrier components of the signals radiated by the two transmitters 10 and 12 are not used. The manner of determining the effective spacing between the isophase surfaces of each family is discussed more fully below.

By heterodyning the carrier components of the signals radiated by the transmitters 10, 11 and 12 in pairs to produce resultant signals in the manner more fully explained below, the need for phase synchronization between the carrier components of the radiated signals is entirely obviated. For a mathematical analysis of the manner in which this is accomplished, attention is directed to the disclosure of the above-cited Honore patent.

The equipment provided at the reference and elevation transmitter unit 14 serves the threefold function of converting the waves radiated from the transmitters 10, 11 and 12 into position reference signals and transmitting these signals to the mobile receiving unit 15; generating elevation signals; and converting the generated elevation signals into elevation reference signals and radiating the latter signals to the mobile unit 15. In brief and as best shown in Fig. 2 of the drawings, the equipment provided in the unit 14 to develop the position reference signals comprises radio frequency selector and amplifier units 16, 19 and 22 of conventional design for respectively receiving and amplifying the signals radiated by the transmitters 10, 11 and 12; exceedingly narrow band pass filters 17, 20 and 23 for respectively passing the carrier components of the reproduced waves developed at the output sides of the selector and amplifier units 16, 19 and 22 while rejecting the modulation components of these waves; a pair of mixers 18 and 21 for heterodyning the carrier wave components of the received signals in pairs to obtain sum and difference frequency signals; filters 24 and 26 for selectively passing the difference or beat frequency components of the heterodyned signals; and frequency dividers 25 and 27 for reducing the beat frequency signals to the desired frequency values. With this arrangement, the desired pair of position reference signals are developed across the respective sets of output terminals of the frequency dividers 25 and 27.

For the dual purpose of transmitting the described position reference signals to the mobile receiving unit 15 and of radiating elevation signals which blanket the area 13 under survey, a pair of ultra high frequency transmitters 28 and 29 are provided, which preferably are of limited power just sufficient to permit adequate reception of the signals radiated thereby at all points within the survey area 13 under all operating conditions. Each of the two transmitters 28 and 29 comprises an ultra high frequency master oscillator and a modulator and power amplifier unit and includes its own individual antenna. Thus the transmitter 28 comprises a master oscillator 28a, designed to operate at a stable frequency of 152 megacycles, for example, a modulator and power amplifier unit 28b in which the position signal developed across the output terminals of the frequency divider 25 is amplitude modulated upon the carrier wave output of the oscillator 28a and an antenna 40 at which the position signal modulated elevation signal developed by the transmitter 28 is radiated. Similarly, the transmitter 29 comprises a master oscillator 29a, designed to operate at a stable frequency of 152.1 megacycles, for example, a modulator and power amplifier unit 29b in which the position signal developed across the output terminals of the frequency divider 27 is amplitude modulated upon the carrier wave developed by the oscillator 29a and an antenna 41 from which the position signal modulated elevation signal developed by the transmitter 29 is radiated.

As stated above, facilities are also provided in the reference and elevation transmitter unit 14 for developing elevation reference signals and transmitting the same to the mobile receiving unit 15. These facilities comprise radio frequency selector and amplifier units 32 and 35 for respectively receiving the signals radiated by the transmitters 28 and 29, narrow band pass filters 33 and 36 for passing the carrier wave components of the waves reproduced respectively by the units 32 and 33 while rejecting the modulation components thereof, a mixer 34, a filter 37 for selecting the difference or beat frequency component of the heterodyned waves, a frequency divider 38 for reducing the selected beat frequency signal to the desired frequency value and a link transmitter 39 for transmitting the elevation reference signal to the mobile receiving unit 15. The transmitter 39 is preferably of the low power, ultra high frequency, line-of-sight type and comprises a master oscillator 39a operated at a distinctive frequency of 170 megacycles and a modulator and power amplifier unit 39b in which the elevation reference signal developed across the output terminals of the frequency divider 38 is amplitude modulated on the carrier wave output of the oscillator 39a, amplified and delivered to the antenna ground circuit of the transmitter 39 for radiation to the mobile receiving unit 15.

If desired, the equipment embodied in the reference and elevation unit 14 may be simplified somewhat by employing the modified arrangement illustrated in Fig. 2A of the drawings. As there shown, carrier waves extracted directly from the oscillators 28a and 29a of the transmitters 28 and 29 are fed directly to the mixer 34 over conductive channels in the form of coaxial cables. The beat frequency signal obtained by heterodyning the two carrier waves in the mixer 34 is selectively passed by the filter 37, reduced in frequency by the frequency divider 38 and amplitude modulated upon the carrier wave output of the oscillator 39a in the modulator and power amplifier unit 39b for radiation by the transmitter 39. By directly heterodyning the waves produced by the oscillators 28a and 29a in the mixer 34 to produce the desired elevation reference signal, the selector and amplifier sections 32 and 35 and the filters 33 and 36 may be omitted from the equipment embodied in the unit 14.

As indicated above, one of the functions assigned the transmitters 28 and 29 is that of producing elevation signals from which may be determined the elevation of any survey point within the area 13 under survey. To this end, the antennas 40 and 41 of these transmitters are positioned at different known elevations above the earth's surface or more particularly above a known elevation datum plane. Thus and as best shown in Fig. 3 of the drawings, the antenna 40 is disposed above the antennas 41 in vertical alignment therewith and the two antennas are disposed different known or determinable distances above a point A of known elevation. The point A should have an elevation greater than the elevation of any surface point of the earth within the area under survey and the exact elevation of which may be determined by conventional surveying methods. Preferably, the facilities for supporting the antenna 41 are such that this antenna may be adjusted to an exact predetermined elevation D1 above the point A. Similarly, the antenna 40 is preferably adjustable to a precisely determined elevation D2 above the antenna 41. The vertical space D2 between the two antennas 40 and 41 is preferably an integer multiple of the mean wave length of the carrier wave components of the modulated signals radiated by the transmitters 28 and 29. Coaxial cables 42 and 43 are employed respectively to connect the antennas 40 and 41 to the antenna terminals of the modulator and power amplifier units 28b and 29b.

With the transmitters 28 and 29 in continuous operation, a set of hyperbolic isophase surfaces is produced in space through interference of the carrier wave components of the signals radiated by these transmitters. These surfaces represent the loci of positions of constant phase difference between the carrier components of the radiated waves and have the antennas 40 and 41 as foci. In any vertical plane bisecting the antennas 40 and 41, the loci of points of constant phase difference between the radiated waves may of course be represented as hyperbolic lines in the manner shown in Fig. 3. Thus the hyperbolic lines 47 represent the loci of points of constant phase difference between the carrier components of the radiated waves at points spaced laterally from the radiating antennas 40 and 41 disposed in a common vertical plane bisecting these two antennas. Obviously, by rotating this plane through 360°, the isophase surfaces are developed. The manner in which this family of isophase surfaces is utilized in conjunction with the position signals radiated from the transmitters 10, 11 and 12 and the position reference signals radiated from the unit 14 to determine the elevation of any point within the area under survey and the effective spacing between these surfaces is determined are explained more fully below.

From the above explanation, it will be apparent that three reference signal modulated carrier waves are radiated from the transmitters 28, 29 and 39 at the reference and elevation transmitter unit 14 to the mobile receiving unit 15 which may be located adjacent any survey point in the area under survey. Identical signals are radiated by the equipment shown in Fig. 2 and this same equipment when modified in the manner shown in Fig. 2A. It is the purpose and function of the equipment provided in the mobile receiving unit 15 to convert these received signals and those received directly from the transmitters 10, 11 and 12 into indications representative of the position and elevation of a survey point at which the signals are collected. Briefly, and as best shown in Figs. 4 and 5 of the drawings, the equipment provided in the mobile receiving unit 15 to perform this function comprises wave receiving, translating, phase comparing and recording equipment, and wave collectors in the form of antennas 44a and 44b. As best shown in Fig. 3 of the drawings, the wave collecting antennas 44a and 44b are insulated from each other and ground and are carried by a mobile antenna support 46 consisting of a frame 46a and wheels 46b. The two antennas are disposed in vertical alignment and preferably are adjustable, within limits, to position the antenna 44a a desired elevation D3 above the survey point B on the earth's surface. From the antenna 44a the collected ultra high frequency waves are transmitted through a coaxial cable 45 to three ultra high frequency receivers 48, 49 and 58. Similarly, modulated carrier waves in the broadcast band collected by the antenna 44b are transmitted over an insulated conductor 45b to the input terminals of three radio frequency selector and amplifier units 59, 61 and 64. The receiver 48 is designed to accept the modulated 152 megacycle signal radiated from the transmitter 28 and comprises radio frequency selector and amplifier stages 50 followed by the usual converter, intermediate frequency selector, second detector and low frequency amplifier stages which are collectively indicated as being included in the block 51. Similarly, the receiver 49 is designed to accept the modulated signal radiated by the transmitter 29 and comprises the usual radio frequency selector and amplifier stages 52 followed by the usual converter, intermediate frequency amplifier, second detector and low frequency amplifier stages collectively indicated as being included within the block 53. Portions of the signal voltages developed across the respective output terminals of the selector and amplifier stages 50 and 52 are impressed upon the input terminals of exceedingly narrow band pass filters 54 and 55 having the function of passing the carrier components of the selected waves and rejecting the modulation components of these waves. The carrier wave components passed by the filters 54 and 55 are heterodyned in a mixer 56 to produce sum and difference frequency signals in the usual manner, and the difference or beat frequency signal is selectively passed by a filter 56a, reduced to a frequency equaling that of the signal developed at the output terminals of the frequency divider 38 by a frequency divider 57 and impressed upon the upper set of input terminals of a phase meter 73 over the circuit conductors 57a. As explained more fully below, this signal is phase compared with the elevation reference signal transmitted to the mobile receiving unit 15 from the transmitter 39. More specifically, the receiver 58 performs the function of selecting and demodulating the modulated wave transmitted by the link transmitter 39 to reproduce the elevation reference signal across its output terminals. This reference signal is impressed across the lower set of input terminals of the phase meter 73 over the circuit conductors 58a.

The position reference signals respectively transmitted to the mobile receiving unit 15 from the transmitters 28 and 29 are selected, detected and amplified respectively in the stages 50 and 51 of the receiver 48 and the stages 52 and 53 of the receiver 49. Thus the position reference signal resulting from heterodyning, selecting and frequency dividing the carrier components of the signals radiated from the transmitters 10 and 11 at the reference and elevation transmitter unit 14 are reproduced across the output terminals of the receiver 48. Similarly, the position reference signal resulting from heterodyning, selecting and frequency dividing the carrier wave components of the signals radiated by the transmitters 11 and 12 at the reference and elevation transmitter unit 14 are reproduced across the output terminals of the receiver 49. These position reference signals are impressed respectively upon the lower sets of input terminals of the phase meters 72 and 71 over the circuit conductors 51a and 53a.

In order to develop position signals at the mobile receiving unit 15 for phase comparison with the position reference signals impressed upon the respective lower sets of input terminals of the phase meters 72 and 71, facilities are provided in the unit 15 for directly receiving the signals radiated by the transmitters 10, 11 and 12. More specifically, the signal originating at the transmitter 10 is selected and amplified by the selector and amplifier unit 59 and delivered to an exceedingly narrow band pass filter 60 having the function of passing the carrier wave component of the signal while rejecting the modulation components thereof. Similarly, the radio frequency selector and amplifier unit 61 selects and amplifies the signal modulated carrier radiated by the transmitter 11 and transmits the same to an exceedingly narrow band pass filter 62 which passes the carrier component of the signal and rejects the modulation components thereof. The signal modulated carrier radiated by the transmitter 12 is selected and passed by the selector and amplifier unit 64 and delivered to an exceedingly narrow band pass filter 65 which passes the carrier wave component thereof and rejects the modulation components. Thus the carrier wave components of the signals originating at the three transmitters 10, 11 and 12 are received, selected, amplified and separated from the modulation components of these signals at the receiving unit 15. After such separation, the carrier waves developed at the output terminals of the filters 60 and 62 are heterodyned in a mixer 63 to produce the usual sum and difference frequency signals. The difference frequency signal is selectively passed by a filter 67, frequency divided by a frequency divider 68 and impressed upon the upper set of input terminals of the phase meter 72 over the circuit conductors 68a. Similarly, the carrier wave components of the signals originating at the transmitters 11 and 12 as reproduced at the output sides of the filters 62 and 65 are heterodyned in a mixer 66 to produce the usual sum and difference frequency signals. The difference frequency signal is selectively passed by a filter 69, frequency divided by a frequency divider 70 and impressed upon the upper set of input terminals of the phase meter 71 over the circuit conductors 70a.

In order to record the indications produced by the three phase meters 71, 72 and 73 along with seismic wave data upon a common record strip, a strip recorder 74 of the well known oscillographic type is provided, together with facilities for translating angular variations in the indicating needles of the three phase meters into current variations through the galvanometer coils of the recorder. The oscillographic recorder 74 is preferably of the twenty-four trace variety and may be of any desired commercial construction. It comprises twenty-four galvanometer coils, eight of which are illustrated in the drawings, each having the function of variably controlling the impingement of a light beam on a common light sensitive strip 75. The phase meters 71, 72 and 73 may be of any desired commercial type (see Patent No. 1,762,725—Marrison—granted June 10, 1930), and are capable of measuring phase angles in excess of 360 electrical degrees between two impressed signal voltages of the same frequency. Each phase meter is equipped with a rotor element carrying a pointer which indexes with a circular scale to indicate the phase relationship between the two impressed voltages. The rotor shafts of the three phase meters, indicated at 76, 85 and 94, are also arranged to control the settings of six potentiometers, 79, 82, 88, 91, 97 and 100 which respectively govern the magnitude of current flow through six galvanometer coils 81, 84, 90, 93, 99 and 102 of the recorder 74. More specifically, the rotor shaft 76 of the phase meter 71 is connected in driving relationship with the wiper 79a of the potentiometer 79 through reduction gearing comprising a pair of gears 77 and 78. The resistor 79b of this potentiometer is arranged to be adjustably encircuited in the energizing circuit for the galvanometer coil 81 in series with an energizing battery 80. The purpose of providing the described facilities comprising the reduction gears 77 and 78, the potentiometer 79 and the battery 80 to control the magnitude of current flow through the galvanometer coil 81 is that of permitting the recordation of data identifying a particular lane in which the wave collecting antenna 44 may be positioned or more particularly the particular pair of effective isophase lines of the family of isophase lines produced by the transmitters 10 and 11 between which this antenna is disposed at any particular survey point B. Similar facilities comprising the reduction gears 86 and 87, the potentiometer 88 and the battery 89 are provided to control the magnitude of current flow through the galvanometer coil 90 in identical fashion, so that lane identification in respect to the position of the survey point B relative to the family of hyperbolic isophase lines produced by the signals radiated from the transmitters 11 and 12 is recorded on the record strip 75. Recordation of phase meter indications identifying the particular pair of effective isophase lines 47 between which the wave collecting antenna 44 may be disposed is accomplished by connecting the rotor shaft 94 of the elevation phase meter 73 through the reduction gears 95 and 96 to control the setting of the wiper 97a embodied in the potentiometer 97. The setting of this wiper obviously controls the magnitude of current flow from the energizing battery 98 through the galvanometer coil 99.

In order to provide visual indications of the lanes in which the wave collecting antenna 44 is disposed, the shafts 78c, 87c and 96c rotated respectively by the large gears 78, 87 and 96 are respectively equipped with pointers 78a, 87a and 96a arranged to cooperate with scales 78b, 87b and 96b in producing the desired lane indications. Preferably, the scales 78b, 87b and 96b are each graduated in terms of lane width as determined by the transmitter operating frequencies, so that the particular lanes in which the antenna 44 is disposed may be read directly by observing the positions of the pointers 78a, 87a and 96a relative to their respective associated scales.

In addition to controlling the operation of the recorder 74 in the recording of lane identification information on the record strip 75, the three phase meters 71, 72 and 73 are arranged to so govern the recorder that records are also produced on the record strip from which the particular phase settings of the rotor elements embodied in the three meters may respectively be determined. To this end, the shaft 76 is arranged directly to actuate the wiper 82a of the potentiometer 82 so that an adjustable portion of the potentiometer resistor 82b is encircuited with the galvanometer coil 84 in series with an energizing battery 83. Similarly, the rotor shafts 85 and 94 are arranged respectively to control the settings of the two potentiometers 91 and 100 which govern the magnitudes of current flow from the batteries 92 and 101 through the galvanometer coils 93 and 102, respectively. Thus the phase meters 71, 72 and 73 are arranged to produce a full and complete record identifying the position and elevation of the survey point on the record strip 75. In this regard, it is noted that the galvanometer elements in which the coils 81, 84, 90, 93, 99 and 102 are respectively embodied individually control the positions of the record traces 81a, 84a, 90a, 93a, 99a and 102a transversely of the strip 75 or more particularly the vertical displacement of these traces from respective associated reference traces 81b, 84b, 90b, 93b, 99b and 102b.

The seismic wave detecting and translating equipment associated with the remaining galvanometer elements of the recorder 74 or a portion thereof comprises a plurality of seismic wave detectors, two of which are indicated at 103 and 104, and amplifying channels individually associated with these detectors. In the arrangement illustrated, the detector 103 is connected to transmit detected seismic waves through an amplifier 105 to the galvanometer coil 107 of the recorder 74. Similarly, the detector 104 is arranged to deliver detected seismic waves through an amplifying channel 106 to the galvanometer element 109 of the recorder 74. It will be understood that any number of seismic wave detectors and associated amplifying channels may be employed in a given set-up within the limitation imposed by the available galvanometer elements of the recorder. It will also be understood that in an actual set-up, the detectors may be arranged in any desired arrangement relative to a shot point at which seismic wave generation occurs.

Where not otherwise specified in the foregoing description, the components of the described system are entirely conventional and well known in the art. It should be pointed out that the filters 17, 20, 23, 33, 36, 54, 55, 60, 62 and 65 are preferably of the crystal controlled type, each having a narrow pass band of the order of fifty cycles or less in width, such that all side band frequencies are substantially completely suppressed without undue attenuation of the carrier wave components. Filters of the type indicated having the desired narrow band pass characteristics are well known in the art. If found necessary to provide adequate driving voltage for the various frequency dividers, one or more stages of carrier wave amplification may be provided immediately following each of the enumerated filters.

As previously pointed out with reference to Fig. 3 of the drawings, in setting up the equipment to perform survey work in the area 13 under survey, the reference and elevation transmitter unit 14 is located at a high point preferably adjacent or within the boundary of the area to be surveyed. Further, the elevation of the earth's surface point A in vertical alignment with the two elevation transmitting antennas 40 and 41 is determined by conventional survey methods. These two antennas are adjusted to the desired known elevations which will produce in space the vertically spaced hyperbolic isophase surfaces. More particularly, the two antennas are spaced apart an integer multiple of the wave length of the average frequency of carrier radiation by the two transmitters 28 and 29. Since the elevations of the two antennas 41 and 40 are known or may easily be determined from the known elevation of the surface point A, the actual elevation at any point within the system of isophase surfaces provided by the carrier waves radiated from these antennas may be determined when the position of the point laterally with respect to the transmitting antennas 40 and 41 is known. Determination of the position of the wave collecting point is effected by utilizing the two intersecting hyperboloidal systems of isophase surfaces produced in space by the carrier components radiated by the three transmitters 10, 11 and 12.

Before describing the operation of the system, it should be pointed out that as viewed from the receiving and translating equipment provided at the mobile unit or station 15, the effective spacing between the hyperbolic isophase surfaces produced by the carrier waves radiated by each pair of transmitters 10—11, 11—12 and 28—29 is that which will produce 360 degrees of rotation of the rotor element in the phase meter 71, 72 and 73 which responds to the carrier waves radiated by the particular pair of transmitters when the collecting antennas 44a and 44b are moved across the interference pattern produced by these carrier waves. This effective spacing is determined by two factors, namely, the mean frequency of the carrier waves radiated by the pair of transmitters and the extent to which the beat frequency signal produced by heterodyning these carrier waves at the stations 14 and 15 is frequency divided at these stations to obtain the signals which are phase compared at the station 15. More specifically, the effective isophase surface spacing as measured along the base line between the radiation points of a particular pair of transmitters is equal to one-half the wave length corresponding to the mean frequency of the carriers radiated by the two transmitters multiplied by the factor used in frequency dividing the beat frequency signal obtained by heterodyning the two carriers at the stations 14 and 15. In the illustrated system arrangement, each of the three beat frequency signals developed at each of the stations 14 and 15 is frequency divided by a factor of ten. Accordingly and considering the pair of elevation position signal transmitters 28 and 29 by way of example, the effective spacing between the isophase surfaces resulting from carrier wave radiation by these transmitters as measured along the vertical line connecting the antennas 40 and 41, is five times the wave length corresponding to the mean carrier frequency of 152.05 megacycles, i. e., approximately ten meters. At points laterally displaced from this vertical line, the effective spacing between the equiphase surfaces is greater due to the hyperbolic contour of the surfaces. For convenience of explanation, it is assumed that the isophase lines 47 shown in Fig. 3 of the drawings are spaced in accordance with the effective spacing described above, i. e., are spaced apart approximately ten meters along the vertical line connecting the antennas 40 and 41.

In considering the operation of the above described system, it will be understood that at any location of the mobile receiving unit 15 and more particularly the wave collecting antennas 44a and 44b within the radius of transmission of the transmitters 10, 11, 12, 28, 29 and 39, the equipment provided in the mobile receiving unit is arranged to provide three phase indications which definitely locate the position of the collecting antennas and the elevation of the antenna 44a above the survey point. The survey points may comprise the location of shot holes and the locations of the seismic wave detectors arranged in a given array relative to a particular shot hole. More in detail, the amplitude modulated signal radiated by the transmitter 10 is selected and amplified at the unit 14 by the selector and amplifier stages 16 and the 620 kilocycle carrier wave component is selectively passed to the exclusion of the modulation components by the band pass filter 17 and impressed upon the upper set of input terminals of the mixer 18. Similarly, the selector and amplifier unit 22 and the band pass filter 23 function to separate the 760 kilocycle carrier wave component of the signal radiated by the transmitter 12 and to impress this carrier wave upon the lower set of input terminals of the mixer 21. The selector and amplifier unit 19 and the band pass filter 20 separate the 670 kilocycle carrier wave component from the signal radiated by the transmitter 11 and impress this carrier wave upon the respective upper and lower sets of input terminals, respectively, of the two mixers 21 and 18. The mixer 18 operates to produce the usual sum and difference frequency signals across its output terminals when energized by the 670 and 620 kilocycle input signals. However, only the difference frequency signal of 50 kilocycles as developed across the output terminals of the mixer 18 is passed by the filter 24. This 50 kilocycle signal is frequency divided by a factor of ten through operation of the frequency divider 25 which may comprise one or more stages, such that a 5 kilocycle signal is developed at the output terminals of the frequency divider for modulation upon the 152 megacycle carrier wave radiated by the transmitter 28. In a similar manner, the 670 kilocycle and 760 kilocycle carrier waves developed at the respective output sides of the filters 20 and 23 are heterodyned in the mixer 21 to produce a 90 kilocycle difference frequency signal which is selectively passed by the filter 26 and frequency divided by a factor of ten through operation of the frequency divider 27 to produce a 9 kilocycle signal. This signal is modulated upon the 152.1 megacycle carrier wave radiated by the transmitter 29.

When the system arrangement illustrated in Fig. 2 of the drawings is used, the two position reference signal modulated carrier waves radiated by the transmitters 28 and 29 are respectively received and amplified by the selector and amplifier units 32 and 35. The carrier wave components of the selected waves are passed by the two filters 33 and 36, heterodyned in the mixer 34 to produce a difference frequency signal of one hundred kilocycles which is reduced to a frequency of 10 kilocycles through operation of the frequency divider 38 and impressed upon the 170 megacycle carrier wave output of the transmitter 39 for radiation to the mobile receiving unit 15.

Alternatively, if the system arrangement illustrated in Fig. 2A of the drawings is employed, the 10 kilocycle elevation reference signal is developed by directly heterodyning the 152 and 152.1 megacycle waves developed by the oscillators 28a and 29a in the mixer 34. The desired 100 kilocycle reference signal appearing at the output terminals of the mixer 34 is selectively passed by the filter 37 and frequency divided by a factor of ten through operation of the frequency divider to produce a 10 kilocycle signal. This signal is modulated upon the 170 megacycle carrier wave output of the transmitter 39 for radiation to the mobile receiving unit 15.

From the preceding explanation, it will be apparent that regardless of whether the Fig. 2 or Fig. 2A arrangement of the equipment provided at the reference and elevation transmitter unit is used, five distinct and useful signals are radiated from this unit to the mobile receiving unit 15 even though only three transmitters are provided at the reference and elevation unit. This is accomplished by employing the transmitters 28 and 29 in the dual capacity of elevation signal transmitter and link transmitters for relaying the two position reference signals to the mobile receiving unit. More specifically, the modulated wave radiated by the transmitter 28 consists of a 152 megacycle carrier component which is used as an elevation signal and a 5 kilocycle modulation component which is employed as a position reference signal; the modulated wave radiated by the transmitter 29 consists of a 152.1 megacycle carrier wave component which is used as the second elevation signal and a 9 kilocycle modulation component which constitutes the second position reference signal; and the transmitter 39 radiates a 170 megacycle carrier wave modulated with a 10 kilocycle component which is used as an elevation reference signal.

At the mobile receiving unit 15, the ultra high frequency waves radiated from the three transmitters 28, 29 and 39 are collected by the antenna 44a and transmitted over the coaxial cable 45a to the input terminals of the three receivers 48, 49 and 58. Similarly, the relatively low frequency waves radiated by the transmitters 10, 11 and 12 are collected by the antenna 44b and transmitted over the conductor 45b to the three radio frequency selector and amplifier units 59, 61 and 64. The radio frequency selector and amplifier section 50 of the receiver 48 selects the modulated 152 megacycle signal radiated by the transmitter 28, and the 5 kilocycle position reference signal component of the selected wave is detected and reproduced by the succeeding stages of the receiver 48 and impressed upon the lower set of input terminals of the phase meter 72 over the circuit conductors 51a. Similarly, the modulated 152.1 megacycle wave radiated by the transmitter 29 is selectively passed and amplified by the selector and amplifier section 52 of the receiver 49 and the 9 kilocycle position reference signal component of this wave is reproduced by the succeeding stages of the receiver 49 and applied to the lower set of input terminals of the phase meter 71 over the circuit conductors 53a. The 9 and 5 kilocycle position signals which are phase compared with the described position reference signals of like frequencies are developed locally at the mobile receiving unit 15. To this end, the modulated 620, 670 and 760 kilocycle signals radiated by the transmitters 10, 11 and 12 are respectively selected by the radio frequency selector and amplifier units 59, 61 and 64 for carrier wave filtering by the narrow band pass filters 60, 62 and 65. Thus the 620 kilocycle and 670 kilocycle carrier wave components of the signals originating at the transmitters 10 and 11 are impressed upon the two sets of input terminals of the mixer 63 and the 670 and 760 kilocycle carrier wave components of the signals originating at the transmitters 11 and 12 are impressed upon the two sets of input terminals of the mixer 66. The mixer 63 functions to produce the usual sum and difference frequency signals, the latter of which is selectively passed by the 50 kilocycle filter 67 and frequency divided by a factor of ten in the frequency divider 68 to produce a 5 kilocycle position signal which is impressed upon the upper set of input terminals of the phase meters 72 over the circuit conductors 68a. In an identical manner, the mixer 66 functions to heterodyne the 670 and 760 kilocycle signals to produce sum and difference frequency signals. The difference frequency signal of 90 kilocycles is selectively passed by the filter 69 and frequency divided by a factor of ten in the frequency divider 70 to produce a 9 kilocycle position signal which is impressed upon the upper set of input terminals of the phase meter 71 over the circuit conductors 70a.

The 10 kilocycle elevation reference signal modulated on the carrier wave radiated by the transmitter 39 is detected and reproduced by the receiver 58 for application to the lower set of input terminals of the phase meter 73 over the circuit conductors 58a. An elevation signal is also developed locally at the mobile receiving unit 15 by heterodyning the carrier wave components of the waves radiated by the transmitters 28 and 29. To this end, a portion of the signal voltage appearing at the output side of the selector and amplifier section 50 of the receiver 48 is impressed upon the input terminals of the band pass filter 54 which functions to pass the 152 megacycle carrier wave component and to reject the 5 kilocycle modulation component. The carrier wave component selected by the filter 54 is impressed upon the lower set of input terminals of the mixer 56. Similarly, a portion of the signal voltage appearing at the output side of the radio frequency section of the receiver 49 is impressed upon the input terminals of the band pass filter 55 with the result that the 152 megacycle carrier wave component of the signal voltage is passed by this filter for application to the upper set of input terminals of the mixer 56. This mixer functions to heterodyne the two signals with the result that the usual sum and difference frequency signals are developed across the output terminals thereof. The one hundred kilocycle difference frequency signal is selectively passed by the filter 56a and frequency divided by a factor of ten through operation of the frequency divider 57 to produce a 10 kilocycle elevation signal which is impressed upon the upper set of input terminals of the phase meter 73 over the circuit conductors 57a.

When thus energized by the two input signals of like frequency, i. e., 10 kilocycles, which may have a phase displacement ranging from zero to more than 360°, the rotor element of the phase meter 73 assumes a setting precisely representative of the phase angle between the two signal voltages and hence provides an indication of the position of the wave collecting antenna 44a relative to two of the isophase lines 47. As noted above, with the described arrangement, wherein elevation signals having frequencies of 152 and 152.1 megacycles are heterodyned, the effective spacing between the isophase surfaces produced in space and hence the isophase lines 47 is in part determined by the mean frequency of 152.05 megacycles between the two elevation signal frequencies and in part by the factor of ten used in frequency dividing the beat frequency signals in the frequency dividers 38 and 57. Using the values given, the isophase lines 47 representative of the same phase relationship between the standing waves are effectively spaced apart vertically a minimum distance of about 10 meters along the vertical line extending through the antennas 40 and 41 and an increasingly greater distance at lateral points increasingly distant from this vertical line. Hence the indication provided by the phase meter 73 identifies the position of the wave collecting antenna 44a within a vertical zone having a minimum width of about 10 meters. Specifically, the indication provided by the meter 73 shows the position of the wave collecting antenna in terms of the vertical distance of this antenna from each of the two adjacent isophase lines 47a and 47b. Further, the position of the indicating needle 96a relative to the lane scale 96b identifies the particular pair of isophase lines between which the wave collecting antenna 44a is disposed. Thus the phase meter 73 in cooperation with the scale and pointer assembly actuated by this meter functions to provide an indication of the exact location of the antenna 44a relative to a particular pair of isophase lines 47a and 47b. However, these facilities do not alone indicate the position of the antenna 44a relative to the transmitting antennas 40 and 41 and hence do not alone indicate the elevation of the survey point B. Positional information is supplied by the phase meters 71 and 72 which identify the geographic location of the survey point B.

At this point it may be noted that if the beat frequency signals are frequency divided by a factor of ten in the manner described and the vertical spacing between the antennas 40 and 41 equals five times the waves length of a wave having a frequency equaling the mean frequency of the elevation signals, only two isophase surfaces are effectively produced in space and hence the total indicating range of the phase meter 73 is 360°. Thus if the transmitters are operated at the indicated carrier frequencies of 152 and 152.1 megacycles such that the mean carrier frequency is 0.1 megacycle, the beat frequency signal therebetween is divided by ten, and the antennas 40 and 41 are spaced apart a distance of approximately 10 meters, the total 360° indicating range of the phase meter 73 covers a vertical distance range of approximately thirty-three feet at the antennas and ranging upward from this distance at points spaced laterally from the transmitters. An arrangement of this character obviously makes it possible to omit the lane identification apparatus comprising the elements 95, 96, 96a, 96b, 96c, 97 and 98 from the indicating and recording equipment As will be partially apparent from the foregoing explanation, the phase meter 71 responds to the two 9 kilocycle position and position reference signals derived from the carrier wave components radiated by the transmitters 11 and 12 to produce an indication of the position of the wave collecting antenna 44b relative to the hyperbolic surfaces defining the loci of constant phase difference between the standing waves produced in space by the carrier wave components of the signals radiated by the two identified transmitters. In this case, wherein the mean carrier wave signal frequency of the two signals originating at the transmitter 11 and 12 is 715 kilocycles and the beat frequency signals are each frequency divided by ten, the effective spacing between the isophase surfaces is approximately 6,880 feet along the base line connecting the radiating antennas of these two transmitters and greater at positions on either side of this base line. Hence the indication provided by the phase meter 71 identifies the position of the antenna 44b within a zone having a minimum width equal to five times the wave length of the mean frequency signal or 6,880 feet. Further, the indicating needle 87a in cooperation with the lane identification scale 87b function to identify the particular pair of isophase surfaces between which the antenna 44b is disposed.

In a similar manner, the phase meter 72 responds to the 5 kilocycle position and position reference signals derived from the carrier wave components of the signals radiated by the transmitters 10 and 11 to provide an indication representative of the position of the wave collecting antenna 44b relative to a particular pair of hyperbolic isophase surfaces produced in space by the carrier wave components of the signals radiated from the two identified transmitters. This indication is likewise based on the mean frequency of 645 kilocycles between the carrier wave frequencies of the signals radiated by the two transmitters 10 and 11 and the factor of ten used in frequency dividing the beat frequency signals and is equal to 7,630 feet. Here also, the indicating needle 78a in cooperation with the associated lane identification scale 78b identifies the particular pair of isophase surfaces between which the antenna 44b is disposed.

From the preceding explanation, it will be understood that the three phase meters 71, 72 and 73 in cooperation with the associated lane identification scale and pointer assemblies function to provide indications which when correlated specifically identify the position of the antennas 44a and 44b relative to the known positions of the transmitters 10, 11 and 12 and also the elevation of the antenna 44a relative to the known elevations of the transmitting antennas 40 and 41. Further, location of the position of the antenna 44a relative to the known positions of the transmitters 10, 11 and 12 definitely fixes the geographic position of this antenna. Once this position is known, the elevation of the antenna 44a may readily be determined by consulting hyperbolic charts prepared to show the effective isophase lines produced in space by the waves radiated from the antennas 40 and 41 by the transmitters 28 and 29. Once the elevation of the antenna 44a relative to the known elevation of the antennas 40 and 41 is thus determined, it is a simple matter to determine the elevation of the survey point B by subtracting the distance D3 from the indication elevation of the antenna 44a. To summarize, the phase meters 71, 72 and 73 provide indications which definitely fix in three dimensions the position of the wave collecting antenna 44a in space and hence identify the geographic position of this antenna as well as the elevation thereof relative to a known datum elevation such, for example, as sea level.

As described above, the rotatable indicating elements of the three phase meters 71, 72 and 73 are arranged to control the settings of the six potentiometers 79, 82, 88, 91, 97 and 100. Hence as the settings of the phase meter indicating elements are changed, the magnitudes of current flow through the respective associated galvanometer coils 81, 84, 90, 93, 99 and 102 are correspondingly changed to produce corresponding changes in the settings of the galvanometer mirrors respectively associated with these coils. Thus the system is so arranged that the six indications necessary to determine in three dimensions the position of the wave collecting antenna 44a in space may be recorded by the recorder 74 on the same record strip 75 as the seismic signals developed during a seismic shooting operation.

The manner in which the seismic wave detectors 103—104 are arranged in a predetermined array relative to a shot point and function to convert into electrical signals the reflected and refracted seismic waves resulting from detonation of an explosive charge at the shot point will be readily understood by those skilled in the art of seismic surveying. In the usual case, the explosive charge is detonated beneath the surface of the earth at a known position displaced a predetermined distance from the detector array, and the detectors are likewise displaced from each other predetermined distances and arranged in a definite array, such, for example, as in line with the shot point. The described system may be employed for the purpose of definitely determining the position and elevation of the shot point as well as the position and elevation of each detector location point in the detector array, all in a manner which will be fully apparent from the foregoing explanation. Specifically, the mobile unit 15 may be moved from point to point to locate the antennas 44a and 44b directly over different survey points B at which the shot point and each detector placement point are located.

As the shot and detector points are successively located, the recorder 74 may be successively operated to produce a series of record indications on the recording strip 75 which may be easily interpreted definitely to identify the geographic location and elevation of each of the points. In this regard it will be understood that during each operation of the recorder 74, each galvanometer element produces a separate and distinct trace on the record strip 75 and the position of the trace transversely of the strip follows variations in the energization of the galvanometer coil embodied in the element. Thus as the galvanometer coil 81 is variably energized under the control of the potentiometer 79 during a given recording operation, a trace 81a is produced on the record strip which follows variations in the energization of the coil 81. Since, however, at any given location on the antenna 44a, the coil 81 is constantly energized by current having a constant magnitude related to the setting of the lane identification needle 78a, a straight line trace 81a is produced on the record strip 75 during the recording operation. The distance between this trace and the reference line 81b, representative of zero energization of the coil 81, is accurately indicative of the particular pair of isophase lines 47 relative to which the antenna 44a is disposed. Further, the setting of the potentiometer 82 as determined by the angular position of the rotor element in the phase meter 71 establishes a given current flow through the galvanometer coil 84 to produce a straight line trace 84a on the record strip 75 which is displaced from the reference line 84b a distance directly representative of the phase indication provided by the phase meter 71.

In a similar manner, the phase meters 72 and 73 cause straight line traces 90a, 93a, 99a and 102a to be produced on the record strip 75 during each recording operation which are respectively spaced from their associated reference lines 90b, 93b, 99b and 102b by distances accurately indicative of the lane and phase indications provided by the two phase meters and their respective associated scale and pointer assemblies. Thus by operating the recorder 74 for a very short interval as each shot and detector point is located, a pictorial record is produced on the record strip 75 which may readily be interpreted to provide all of the necessary position and elevation information regarding the set-up made prior to a shooting operation.

After the explosive charge is located at the shot point and the detectors 103—104 are located in the proper positions relative to the shot points, the explosive charge may be detonated in the usual manner to propagate seismic waves through the subsurface structure of the earth. These waves are reflected and refracted from strata interfaces and the like to be detected by the detectors 103—104. The detected waves are converted into corresponding electrical signals by the detectors 103—104 in the usual manner and these signals are amplified by the amplifiers 105—106 and impressed upon the galvanometer coils 107—108 of the recorder 74. This recorder is operated continuously during the shooting operation so that record traces 107a—108a are produced on the record strip 75 which pictorially depict the detected seismic waves. Concurrently with recording of the seismic wave trains picked up by the detectors 103—104, the traces 81a, 84a, 90a, 93a, 99a and 102a are again produced on the record strip to identify the location of the wave collecting antenna 44a during the shooting operation. After the record is thus completed, it may be severed from the record strip supply roll, developed and interpreted, with all of the necessary information regarding the geographic locations and elevations of the shot and detector points being potrayed on the same record on which the seismic information is recorded.

Referring now more particularly to Figs. 6 and 7 of the drawings, there is illustrated a modification of the system shown in Figs. 1 to 5, inclusive, and more particularly a system arrangement whereby the position and elevation reference signals are transmitted from the reference and elevation transmitter unit 14 to the mobile receiving unit 15 without the use of link transmitters. In Figs. 6 and 7 those system components corresponding to like components of the system shown in Figs. 1 to 5, inclusive, have been identified by the same reference characters. Generally speaking, elimination of the link transmitter 39 at the unit 14 and non-use of the transmitters 28 and 29 as reference signal transmitters is made possible by utilizing wired channels to transmit the position and elevation reference signals from the unit 14 to the unit 15. More specifically, a light weight armored cable 114 having three discrete two-wire signal transmission channels therein is employed to interconnect the two units 14 and 15. This cable is normally carried by a portable reel 115 rotatably supported by a frame 116 and having three sets of slip rings 117, 118 and 119 through which connections are made to the three sets of wire pairs in the cable. At the receiving unit 15 the wire pairs are respectively connected to one set of input terminals of the phase meters 71, 72 and 73. At the reference and elevation transmitter unit 14, the brushes associated with the three sets of slip rings 117, 118 and 119 are respectively connected to the output terminals of the frequency dividers 38, 26 and 27. More specifically, the output terminals of the frequency divider 36 are connected through the slip rings 117 to one pair of conductors of the cable 114 and by way of these conductors, the plug and socket connector 120 and the conductors 114c to the left set of input terminals of the elevation phase meter 73. Thus the 10 kilocycle elevation reference signal developed at the output terminals of the frequency divider 36 during operation of the system is impressed upon the left set of input terminals of the phase meter 73 over a wired channel. Similarly, the 5 kilocycle position reference signal developed across the output terminals of the frequency divider 25 is impressed across the left set of input terminals of the phase meter 72 over a conductive channel which comprises the slip rings 118, a second pair of conductors in the cable 114, the connector 120 and the conductors 114a. The second position reference signal, namely that developed at the output terminals of the frequency divider 27, is impressed upon the left set of input terminals of the phase meter 71 over a conductive channel comprising the slip rings 119, the third pair of circuit conductors in the cable 114, the connector 120 and the conductors 114b. If desired, phase correcting networks may be included in each of the described signal transmission channels to compensate for any phase shift of the position reference signal voltages resulting from the described conductive channel transmission of these signals from the unit 14 to the unit 15.

In setting up the equipment shown in Figs. 6 and 7 for actual operation, it will be understood that the reel 115 and supporting frame 116 may actually form a part of the mobile vehicle or trailer in which the other components of the reference and elevation transmitter unit 14 are carried. The cable 114 is unwound from the reel 115 as required to interconnect the unit 14 with the unit 15 as the latter unit is moved from place to place within the area under survey. The mode of operation of the systems shown in Figs. 6 and 7 is exactly the same as explained above with reference to the system shown in Figs. 1 to 5, inclusive, with the exception of the described manner of transmitting the position reference signals from the unit 14 to the unit 15. In this regard, it is pointed out that since the transmitters 28 and 29 are not employed as position reference signal transmitters, it is unnecessary to provide modulator sections therein. Accordingly, these transmitters are designed to produce carrier waves only at frequencies of 152 and 152.1 megacycles respectively.

From the preceding explanation, it will be apparent that the present invention affords a satisfactory solution to the problem of determining the position and elevation of the survey point with a high degree of accuracy and with a minimum of equipment. Further, the equipment required makes use of existing broadcast transmitters strategically located with respect to a desired area to be surveyed and has great flexibility in respect to the frequencies which may be employed in operating and transmitting equipment embodied in the elevation and reference transmitter unit 14. Since the transmitters provided in this unit may be of the ultra high frequency, low power, line-of-sight type, interference with existing communications services requiring use of the radio frequency spectrum is minimized.

While different embodiments of the invention have been described, it will be understood that various modifications may be made therein which are within the true spirit and scope of the invention as defined in the appended claims.

What is claimed is:

1. A system for in part utilizing the modulated carrier waves radiated from a plurality of geographically spaced broadcast transmitters to determine the position and elevation of a receiving point, comprising a fixed station, a mobile station separated from said fixed station and located at said receiving point, receiving means at each of said stations for separating the carrier wave components of said waves from the modulation components thereof, mixing means at each of said stations for heterodyning in pairs the carrier wave components of said waves to develop at least two position signals at each station, a pair of transmitters at said fixed station for radiating elevation signals of different frequencies and for transmitting the position signals developed at said fixed station to said mobile station, means at said fixed station for heterodyning said elevation signals to develop an elevation reference signal and for transmitting said elevation reference signal to said mobile station, additional receiving means at said mobile station for receiving and separating the position and elevation signals radiated from the transmitters at said fixed station, phase measuring means at said mobile station for measuring the phase relationship between each position signal developed at said mobile station and the corresponding position signal developed by said additional receiving means, thereby to produce indications identifying the position of said receiving point relative to said broadcast transmitters, receiving means at said mobile station for reproducing said elevation reference signal, mixing means at said mobile station for heterodyning the elevation signals reproduced by said additional receiving means to produce a second elevation reference signal, and phase measuring means at said mobile station for measuring the phase relationship between said elevation reference signals to provide an indication of the elevation of said receiving point relative to the elevation of at least one of the transmitters at said fixed station.

2. A system for in part utilizing the modulated carrier waves radiated from a plurality of geographically spaced broadcast transmitters to determine the position and elevation of a receiving point, comprising a fixed station, a mobile station separated from said fixed station and located at said receiving point, receiving means at each of said stations for separating the carrier wave components of said waves from the modulation components thereof, mixing means at each of said stations for heterodyning in pairs the carrier wave components of said waves to develop at least two position signals at each station, means for transmitting the position signals developed at said fixed station to said mobile station, a pair of transmitters at said fixed station for radiating elevation signals of different frequencies, means at said fixed station for heterodyning said elevation signals to develop an elevation reference signal and for transmitting said elevation reference signal to said mobile station, additional receiving means at said mobile station for receiving and reproducing the position and elevation signals transmitted from said mobile station to said fixed station, phase measuring means at said mobile station for measuring the phase relationship between each position signal developed at said mobile station and the corresponding position signal reproduced by said additional receiving means, thereby to develop indications identifying the position of said receiving point relative to said broadcast transmitters, receiving means at said mobile station for reproducing said elevation reference signal, mixing means at said mobile station for heterodyning the elevation signals reproduced by said additional receiving means to produce a second elevation reference signal, and phase measuring means at said mobile station for measuring the phase relationship between said elevation reference signals to provide an indication of the elevation of said receiving point relative to the elevation of at least one of the transmitters at said fixed station.

3. A system for in part utilizing the modulated carrier waves radiated from a plurality of geographically spaced broadcast transmitters to determine the position and elevation of a receiving point, comprising a fixed station, a mobile station separated from said fixed station and located at said receiving point, receiving means at each of said stations for separating the carrier wave components of said waves from the modulation components thereof, mixing means at each of said stations for heterodyning in pairs the carrier wave components of said waves to develop at least two position signals at each station, a pair of transmitters at said fixed station for radiating elevation signals of different frequencies, means at said fixed station for heterodyning said elevation signals to develop an elevation reference signal, a plurality of wired channels interconnecting said stations to transmit the position and elevation reference signals developed at said fixed station to said mobile station, phase measuring means at said mobile station for measuring the phase relationship between each position signal developed at said mobile station and the corresponding position signal developed at said fixed station, thereby to develop indications identifying the position of said receiving point relative to said broadcast transmitters, receiving and mixing means at said mobile station for heterodyning the elevation signals radiated by the transmitters at said fixed station to produce a second elevation reference signal, and phase measuring means at said mobile station for measuring the phase relationship between said elevation reference signals to provide an indication of the elevation of said receiving point relative to the elevation of at least one of the transmitters at said fixed station.

4. A system for in part utilizing the modulated carrier waves radiated from a plurality of geographically spaced broadcast transmitters to determine the position and elevation of a receiving point, comprising a fixed station, a mobile station separated from said fixed station and located at said receiving point, receiving means at each of said stations for separating the carrier wave components of said waves from the modulation components thereof, mixing means at each of said stations for heterodyning in pairs the carrier wave components of said waves to develop at least two position signals at each station, means for transmitting the position signals developed at said fixed station to said mobile station, a pair of transmitters for radiating elevation signals of different frequencies, means for heterodyning said elevation signals to develop an elevation reference signal and for transmitting said elevation reference signal to said mobile station, additional receiving means at said mobile station for receiving and reproducing the position and elevation signals radiated from said pair of transmitters, phase measuring means at said mobile station for measuring the phase relationship between each position signal developed at said mobile station and the corresponding position signal reproduced by said additional receiving means, thereby to develop indications identifying the position of said receiving point relative to said broadcast transmitters, receiving means at said mobile station for reproducing said elevation reference signal, mixing means at said mobile station for heterodyning the elevation signals reproduced by said additional receiving means to produce a second elevation reference signal, and phase measuring means at said mobile station for measuring the phase relationship between said elevation reference signals to provide an indication of the elevation of said receiving point relative to the elevation of at least one of said pair of transmitters.

5. A system for utilizing the modulated carrier waves radiated from a plurality of geographically separated broadcast transmitters to determine the position of a receiving point, comprising a fixed reference station, a mobile station separated from said fixed reference station and located at said receiving point, receiving means at each of said stations for separating the carrier wave components of said waves from the modulation components thereof, mixing means at each of said stations for heterodyning in pairs the carrier wave components of said waves to develop at least two position signals at each station, means for transmitting the position signals developed at said fixed station to said mobile station, and phase measuring means at said mobile station for measuring the phase relationship between each position signal developed at said mobile station and the corresponding position signal developed at said reference station, thereby to produce indications identifying the position of said receiving point relative to said transmitters.

6. A system for utilizing the modulated carrier waves radiated from a plurality of geographically separated broadcast transmitters to determine the position of a receiving point, comprising means for separating the carrier wave components of said waves from the modulation components thereof, means responsive to the carrier wave components of said waves for developing at said receiving point at least two pairs of position signals, the signals of each pair being of the same frequency, and phase measuring means at said receiving point for measuring the phase relationship between the position signals of like frequency, thereby to produce indications identifying the position of said receiving point relative to said transmitters.

7. A system for utilizing the modulated carrier waves radiated from a plurality of geographically separated broadcast transmitters to determine the position of a receiving point, comprising a fixed reference station, a mobile station separated from said fixed reference station and located at said receiving point, receiving means at each of said stations for separating the carrier wave components of said waves from the modulation components thereof, mixing means at each of said stations for heterodyning in pairs the carrier wave components of said waves to develop at least two position signals at each station, a transmitter at said reference station for transmitting the position signals developed at said fixed station to said mobile station, receiving means at said mobile station for receiving and reproducing the position signals transmitted from said reference station to said mobile station, and phase measuring means at said mobile station for measuring the phase relationship between each position signal developed at said mobile station and the corresponding position signal reproduced by said last-named receiving means, thereby to produce indications identifying the position of said receiving point relative to said transmitters.

8. A system for utilizing the modulated carrier waves radiated from a plurality of geographically separated broadcast transmitters to determine the position of a receiving point, comprising a fixed reference station, a mobile station separated from said fixed reference station and located at said receiving point, receiving means at each of said stations for separating the carrier wave components of said waves from the modulation components thereof, mixing means at each of said stations for heterodyning in pairs the carrier wave components of said waves to develop at least two position signals at each station, a plurality of wire channels interconnecting said stations to transmit the position signals developed at said fixed station to said mobile station, and phase measuring means at said mobile station for measuring the phase relationship between each position signal developed at said mobile station and the corresponding position signal developed at said reference station, thereby to produce indications identifying the position of said receiving point relative to said transmitters.

9. A survey system utilizing the modulated carrier waves radiated from a plurality of geographically separated broadcast transmitters to determine the position of a receiving point located within an area under survey, comprising a fixed reference station located at a point within or adjacent the area under survey having an elevation permitting line-of-sight wave propagation to all survey points within said area, a mobile station separated from said fixed reference station and located at said receiving point, receiving means at each of said stations for separating the carrier wave components of said waves from the modulation components thereof, mixing means at each of said stations for heterodyning in pairs the carrier wave components of said waves to develop at least two position signals at each station, line-of-sight transmitting means disposed at said reference station and operative to transmit the position signals developed at said reference station to said mobile station, receiving means at said mobile station for receiving and reproducing the position signals transmitted from said reference station to said mobile station, and phase measuring means at said mobile station for measuring the phase relationship between each position signal developed at said mobile station and the corresponding position signal reproduced by said last-named receiving means, thereby to produce indications identifying the position of said receiving point relative to said transmitters.

10. A system for utilizing the modulated carrier waves radiated from a pair of geographically separated broadcast transmitters to determine the position of a receiving point relative to the known positions of said transmitters, comprising a fixed reference station, a mobile station separated from said reference station and located at said receiving point, means at each of said stations for separating the carrier wave components of said waves from the modulation components thereof, mixing means at each of said stations for heterodyning the carrier wave components of said waves to develop a position signal at each station, means for transmitting the position signal developed at said fixed station to said mobile station, and phase measuring means at said mobile station for measuring the phase relationship between said position signals, thereby to produce an indication of the position of said receiving point relative to said transmitters.

11. A system for utilizing the modulated carrier waves radiated from a pair of geographically separated broadcast transmitters to determine the position of a receiving point relative to the known positions of said transmitters, comprising a fixed reference station, a mobile station separated from said reference station and located at said receiving point, means at each of said stations for separating the carrier wave components of said waves from the modulation components thereof, mixing means at each of said stations for heterodyning the carrier wave components of said waves to develop a position signal at each station, a transmitter at said reference station for transmitting the position signal developed at said fixed station to said mobile station, receiving means at said mobile station for receiving and reproducing the position signal transmitted from said reference station to said mobile station, and phase measuring means at said mobile station for measuring the phase relationship between said position signals, thereby to produce an indication of the position of said receiving point relative to said transmitters.

12. A system for utilizing the modulated carrier waves radiated from a pair of geographically separated broadcast transmitters to determine the position of a receiving point relative to the known positions of said transmitters, comprising a fixed reference station, a mobile station separated from said reference station and located at said receiving point, means at each of said stations for separating the carrier wave components of said waves from the modulation components thereof, mixing means at each of said stations for heterodyning the carrier wave components of said waves to develop a position signal at each station, a wire channel interconnecting said stations to transmit the position signal developed at said fixed station to said mobile station, and phase measuring means at said mobile station for measuring the phase relationship between said position signals, thereby to produce an indication of the position of said receiving point relative to said transmitters.

13. A survey system utilizing the modulated carrier waves radiated from a pair of geographically separated broadcast transmitters to determine the position of a receiving point located within an area under survey, comprising a fixed reference station located at a point within or adjacent the area under survey, a mobile station separated from said reference station and located at said receiving point, means at each of said stations for separating the carrier wave components of said waves from the modulation components thereof, mixing means at each of said stations for heterodyning the carrier wave components of said waves to develop a position signal at each station, line-of-sight transmitting means disposed at said reference station and operative to transmit the position signal developed at said reference station to said mobile station, receiving means at said mobile station for receiving and reproducing the position signal transmitted from said reference station to said mobile station, and phase measuring means at said mobile station for measuring the phase relationship between said position signals, thereby to produce an indication of the position of said receiving point relative to said transmitters.

14. In a system for determining the position of a mobile receiving unit relative to a pair of geographically separated transmitters radiating signals at different frequencies, a fixed position reference unit including means for heterodyning at least certain components of the radiated signals to produce a position signal, and a cable connecting said units and including a conductive channel for transmitting said position signal from said reference unit to said mobile receiving unit.

15. In a position determining system, a pair of geographically separated transmitters radiating signals at different frequencies, a mobile receiving unit including means for heterodyning at least certain components of said signals to produce a first position signal, a fixed position reference unit including means for heterodyning at least certain components of said signals to produce a second position signal, an adjustable length cable connecting said units and including a conductive channel for transmitting said second position signal from said reference unit to said mobile unit, and means included in said receiving unit jointly responsive to said position signals for producing an indication of the position of said mobile receiving unit relative to said transmitters.

16. In a position determining system, a pair of geographically separated transmitters radiating signals at different frequencies, a mobile receiving unit including means for heterodyning at least certain components of said signals to produce a first position signal having a frequency related to the difference frequency of the signals radiated by said transmitters, a fixed position reference unit including means for heterodyning at least certain components of the radiated signals to produce a second position signal having the same frequency as said first position signal, an adjustable length cable connecting said units and including a conductive channel for transmitting said second position signal from said reference unit to said mobile receiving unit, and phase measuring means included in said mobile receiving unit to measure the phase relationship between said position signals, thereby to provide an indication of the position of said mobile receiving unit relative to said transmitters.

17. A system for determining elevation, comprising transmitting means for continuously radiating a pair of waves of different frequencies at two different known elevations above the earth's surface, a mobile station spaced laterally from said transmitting means and including wave collecting means for collecting said waves at a point of unknown elevation disposed a known distance above the earth's surface, wave receiving and translating apparatus at said mobile station for heterodyning the collected waves to produce a first elevation signal having a frequency related to the difference frequency between the collected waves, fixed position wave receiving and translating apparatus for receiving and heterodyning said waves to produce a second elevation signal, means for transmitting said second elevation signal to said mobile station, and phase measuring means at said mobile station for measuring the phase relationship between said first and second elevation signals, thereby to produce an indication of the elevation of said point of wave collection.

18. A system for determining elevation, comprising transmitting means for radiating waves at a plurality of different known elevations above the earth's surface, a wave collector spaced laterally from said transmitting means for collecting said waves at a point of unknown elevation, wave receiving and translating apparatus excited by the collected waves for producing an indication of the elevation of said wave collecting point, and position determining apparatus including means at least partially responsive to said waves for indicating the geographic location of said wave collecting point.

19. A system for determining elevation, comprising means for continuously radiating a pair of waves at two different known elevations above the earth's surface to simulate in space a system of vertically displaced isophase surfaces, wave collecting means for collecting said waves at a point spaced laterally from said transmitting means, wave receiving and translating apparatus excited by the collected waves to produce an indication of the position of said point of wave collection relative to two of said surfaces, and position determining means for indicating the location of said wave collecting point along said surfaces.

20. A system for determining elevation, comprising means for continuously radiating a pair of waves at two different known elevations above the earth's surface to simulate in space a system of vertically displaced isophase surfaces, wave collecting means for collecting said waves at a point spaced laterally from said transmitting means, wave receiving and translating apparatus excited by the collected waves to produce an indication of the position of said point of wave collection relative to two of said surfaces, and position determining means at least partially responsive to said waves for indicating the location of said wave collecting point along said surfaces.

21. A system for determining elevation, comprising transmitting means for continuously radiating a pair of waves of different frequencies at two different known elevations above the earth's surface, a mobile station spaced laterally from said transmitting means and including wave collecting means for collecting said waves at a point of unknown elevation, wave receiving and translating apparatus at said mobile station for heterodyning the collected waves to produce a first elevation signal having a frequency related to the difference frequency between the collected waves, fixed position wave receiving and translating apparatus for receiving and heterodyning said waves to produce a second elevation signal, means for transmitting said second elevation signal to said mobile station, phase measuring means at said mobile station for measuring the phase relationship between said first and second elevation signals, thereby to produce an indication of the elevation of said point of wave collection, and position determining means at said mobile station for indicating the geographic location of said wave collecting point.

22. A system for determining elevation, comprising transmitting means for continuously radiating a pair of waves of different frequencies at two different known elevations above the earth's surface, a mobile station spaced laterally from said transmitting means and including wave collecting means for collecting said waves at a point of unknown elevation, wave receiving and translating apparatus at said mobile station for heterodyning the collected waves to produce a first elevation signal having a frequency related to the difference frequency between the collected waves, fixed position wave receiving and translating apparatus for receiving and heterodyning said waves to produce a second elevation signal, means for transmitting said second elevation signal to said mobile station, phase measuring means at said mobile station for measuring the phase relationship between said first and second elevation signals, thereby to produce an indication of the elevation of said point of wave collection, and position determining apparatus including means at said mobile station at least partially responsive to said waves for indicating the geographic location of said wave collecting point.

23. A system for determining position and elevation, comprising transmitting means for radiating waves at a plurality of different known elevations above the earth's surface, means for modulating at least certain of said waves with position signals, a wave collector spaced laterally from said transmitting means for collecting said waves at a point of unknown location, wave receiving and translating apparatus excited by the collected waves for producing an indication of the elevation of said wave collecting point, and position determining apparatus including means responsive to the modulation components of said waves for indicating the geographic location of said wave collecting point.

24. A system for determining position and elevation, comprising a plurality of spaced transmitters radiating signals at different frequencies, transmitting means for radiating waves at a plurality of different known elevations above the earth's surface, means responsive to the signals radiated by said transmitters for modulating the waves radiated by said transmitting means, a wave collector spaced laterally from said transmitting means for collecting said waves at a point of unknown location, wave receiving and translating apparatus excited by the collected waves for producing an indication of the elevation of said wave collecting point, and position determining apparatus including means responsive to said signals and the modulation components of said waves for indicating the geographic location of said wave collecting point.

25. A system for radiating position and elevation signals, comprising a plurality of geographically spaced transmitters for continuously radiating position signals, transmitting means for radiating elevation signals at a plurality of different known elevations above the earth's surface, and means responsive to the signals radiated by said transmitters for modulating at least certain of the signals radiated by said transmitting means with position reference signals.

26. A system for radiating position and elevation signals, comprising a pair of geographically spaced transmitters for continuously radiating position signals of different frequencies, transmitting means for radiating elevation signals at a plurality of different known elevations above the earth's surface, means for receiving and heterodyning said position signals to produce a position reference signal having a frequency related to the beat frequency of said position signals, and means for modulating one of said elevation signals with said position reference signal.

27. A system for radiating position and elevation signals, comprising a plurality of geographically spaced transmitters for radiating position signals of different frequencies, transmitting means for radiating two elevation signals at a plurality of different known elevations above the earth's surface, means for receiving and reproducing said position signals, means for heterodyning a first pair of said reproduced position signals to produce a first position reference signal having a frequency related to the beat frequency of said pair of position signals, means for heterodyning a second pair of said reproduced position signals to produce a second position reference signal having a frequency related to the beat frequency of said second pair of position signals, and means for respectively modulating said elevation signals with said first and second position reference signals.

28. Wave signal receiving apparatus for translating space radiated waves collected at a receiving point into indications representative of the position of the receiving point, comprising receiving means for receiving a pair of space radiated waves and for heterodyning said waves to produce a first position signal having a frequency related to the difference frequency between said waves, a receiver for receiving and reproducing a second position signal having a frequency equaling the frequency of said first position signal, said position signals being variably displaced in phase by phase angles which may exceed 360 degrees and the phase relationship between said position signals being indicative of the position of said receiving point, phase measuring means excited by said position signals to indicate phase dsplacement between said position signals in increments of less than 360 degrees, and means responsive to operation of said phase measuring means for indicating each additional 360 degree increment of phase displacement between said position signals.

29. Wave signal receiving apparatus for translating space radiated waves collected at a receiving point into indications representative of the position of the receiving point, comprising receiving means for receiving a pair of space radiated waves and for heterodyning said waves to produce a first position signal having a frequency related to the difference frequency between said waves, a receiver for receiving and reproducing a second position signal having a frequency equaling the frequency of said first position signal, said position signals being variably displaced in phase by phase angles which may exceed 360 degrees and the phase relationship between said position signals being indicative of the position of said receiving point, a phase measuring device excited by said position signals to indicate phase displacement between said position signals in increments of less than 360 degrees, said phase measuring device including a rotor element which continuously follows changes in the phase displacement between said position signals, and indicating means controlled by said rotor element to indicate 360 degree increments of phase displacement between said position signals.

30. A system for utilizing the intelligence modulated carrier waves radiated from a plurality of geographically separated transmitters to determine the position of a receiving point relative to the known positions of said transmitters, comprising a reference station, a mobile station separated from said reference station and located at said receiving point, means at each of said stations for separating the carrier wave components of said waves from the modulation components thereof, means at each of said stations responsive to the separated carrier wave components of said waves for developing a position signal at each of said stations, means for transmitting the position signal developed at said reference station to said mobile station, and means at said mobile station jointly responsive to the position signal transmitted to said mobile station from said reference station and the position signal developed locally at said mobile station for producing an indication of the position of said receiving point relative to said transmitters.

31. A system for utilizing the intelligence modulated carrier waves radiated from a plurality of geographically separated transmitters to determine the position of a receiving point relative to the known positions of said transmitters, comprising a reference station, a mobile station separated from said reference station and located at said receiving point, means at each of said stations for separating the carrier wave components of said waves from the modulation components thereof, means at each of said stations for combining the separated carrier wave components of said waves in pairs to produce at least two resultant position signals, means for transmitting the position signals developed at said reference station to said mobile station, and phase measuring means at said mobile station for measuring the phase relationship between the position signals developed locally at said mobile station and the position signals transmitted to said mobile station from said reference station, thereby to produce a plurality of indications representative of the postion of said receiving point relative to said transmitters.

JAMES E. HAWKINS.

REFERENCES CITED

The following references are of record in the file of this patent:

UNITED STATES PATENTS

| Number | Name | Date |
|---|---|---|
| 2,148,267 | Honore | Feb. 21, 1939 |
| 2,403,626 | Wolff | July 9, 1946 |
| 2,408,773 | Goodall | Oct. 8, 1946 |
| 2,413,620 | Guanella | Dec. 31, 1946 |
| 2,413,694 | Dingley | Jan. 7, 1947 |
| 2,440,755 | O'Brien | May 4, 1948 |